United States Patent [19]

Sadoune et al.

[11] 4,337,997
[45] Jul. 6, 1982

[54] ENERGY REFLECTOR AND METHOD OF MAKING

[75] Inventors: Joseph Sadoune, Massy, France; Pierre Laroche, Nalinnes, Belgium

[73] Assignee: BFG Glassgroup, Paris, France

[21] Appl. No.: 118,790

[22] Filed: Feb. 5, 1980

[30] Foreign Application Priority Data

Feb. 9, 1979 [GB] United Kingdom ............... 7904667

[51] Int. Cl.³ .................... G02B 5/10; C03B 23/04
[52] U.S. Cl. ................................ 350/310; 350/296; 156/224; 65/106; 65/59.34
[58] Field of Search ............. 350/310, 288, 296, 293, 350/320; 156/224, 221, 222; 65/106, 59 B

[56] References Cited

U.S. PATENT DOCUMENTS

| | | | |
|---|---|---|---|
| 3,959,056 | 5/1976 | Caplan | 156/197 |
| 4,124,277 | 11/1978 | Stang | 350/310 |
| 4,139,270 | 2/1979 | Dotson | 350/310 |
| 4,229,077 | 10/1980 | Schwab | 350/310 |
| 4,238,265 | 12/1980 | Deminet | 350/310 |
| 4,239,344 | 12/1980 | Wildenrotter | 350/310 |

FOREIGN PATENT DOCUMENTS

| | | | |
|---|---|---|---|
| 2713351 | 9/1977 | Fed. Rep. of Germany . | |
| 1241057 | 8/1960 | France | 350/288 |
| 2111683 | 6/1972 | France | 350/288 |
| 54-136849 | 10/1979 | Japan | 350/288 |
| 1368785 | 10/1974 | United Kingdom . | |
| 1453257 | 10/1976 | United Kingdom | 350/288 |

*Primary Examiner*—Jon W. Henry
*Attorney, Agent, or Firm*—Spencer & Kaye

[57] ABSTRACT

A flexible radiant energy reflecting surface, including a laminate composed of a metal ply, a glass ply having a front face and a rear face, the glass ply being bonded over its entire rear face to the metal ply, in an inter-ply bond, and a radiant-energy reflecting surface associated with one of the plies. The relative thicknesses of the glass and metal plies, the moduli of elasticity of the glass and metal plies, and the efficiency of the inter-ply bond are such that the rear face of the glass ply is not subjected to tensile stresses when the laminate is flexed, within the elastic limit of the metal, such that the front face of the glass ply has a concave curvature of a radius of 10 meters.

45 Claims, 7 Drawing Figures

ENERGY REFLECTOR AND METHOD OF MAKING

BACKGROUND OF THE INVENTION

This invention relates to flexible radiant energy reflectors and to methods of manufacturing them.

Flexible radiant energy reflectors are useful for various purposes. They can be used for example in the production of curved mirrors for decorative purposes or for achieving special visual effects. A very important field of use is the production of curved concave reflectors for reflecting visual light beams from artificial light sources or for reflecting solar radiation, e.g. in solar heating installations.

It is known to use polished sheet metal as a flexible mirror. The use of a polished metal sheet is not satisfactory for some circumstances of use. One reason is the vulnerability of the reflective surface to mechanical damage. Another is the liability of the sheet to distortion consequent upon small changes in temperature.

For meeting high optical specifications it would be better to employ coated glass, the coating comprising a radiant energy reflecting layer which is exposed to radiant energy through the glass. However conventional glass mirrors are substantially non-flexible and in the known art of manufacturing curved glass reflectors, the practice is to cast molten glass into a mould of the desired curved form, or to subject the flat glass to bending forces while it is heated over an extended period of time and/or while the glass is at such elevated temperature that it assumes a desired permanent curvature. The curvature may e.g. be determined by a suitably shaped former. The light-reflecting coating must be applied to the curved glass after it has been bent, for otherwise the optical coating is liable to be spoiled.

These known methods of making curved glass reflectors are very expensive to perform under mass production conditions and to satisfy high product standards.

There is a need for a flexible reflector which incorporates a sheet of glass, and which benefits from the advantages that glass can confer, and which is nevertheless sufficiently flexible to permit it to be easily converted by a flexing operation, without need for the glass to be heated to a high temperature or even at all, into a reflector having the required curvature.

SUMMARY OF THE INVENTION

According to the present invention there is provided a flexible radiant energy reflector in the form of a laminate comprising a glass ply bonded over its whole area to a metal ply, the metal ply or a coating on one of the plies providing a radiant energy-reflecting surface. The relative thicknesses of the glass and metal plies, their moduli of elasticity and the efficiency of the interply bond are such that the face of the glass ply which is nearer the metal ply, the "rear face", is not subjected to tensile forces when the laminate is flexed within the elastic limit of the metal in such manner and to such a degree as to give the front face of the glass ply a concave curvature with a radius of 10 m.

When a reflector according to the invention is subjected to flexing forces causing its flexure in the manner above specified, the rear face of the glass ply becomes convexly curved but due to the presence of such metal ply and the bond between the two plies, tensile loading of that face is avoided on reduced. (Tensile loading is avoided at least until the radius of curvature becomes lower than 10 m). This is important because the imposition of tensile surface stresses in a glass sheet can lead to breakage, particularly if there are surface flaws in the glass which may act as stress raisers.

Reflectors according to the invention can be conveniently made by mass production methods and reflectors so made can be converted to curved or more curved reflectors each conforming with a high degree of accuracy to a predetermined curvature. One or more reflectors according to the invention can be held in a predetermined curved condition by a holding device made for that purpose.

Reflectors according to the invention are particularly suitable for use in making solar energy concentrators comprising an assembly of individual curved reflectors.

A degree of curvature corresponding with a radius of 10 m is adequate for various purposes, for example for a reflector to be used as or as part of a large solar energy concentrator. It is however an important potential advantage of the invention that reflectors which can be flexed to considerably smaller radii can be produced by appropriate choice of the relationship between the products of the thicknesses and elasticity moduli of the glass and metal plies and the efficiency of the inter-ply bond.

The relative thicknesses of the glass and metal plies must be suitable with regard to the elasticity moduli of the glass and metal, the efficiency of the inter-ply bond and the radius or radii of curvature to which the laminate is to be flexed. Other things being equal, the higher the elasticity modulus of the metal is in relation to that of the glass, the lower ca be the thickness ratio $t_m/t_g$ wherein $t_m$ is the thickness of the metal ply and $t_g$ the thickness of the glass ply. By the efficiency of the inter-ply bond is meant the efficiency with which it can transmit stresses from the metal to the glass when the laminate is flexed. An ideal bond of 100% efficiency would be one which resulted in the laminate behaving as a monolithic structure in regard to the stress distribution profile through its thickness. In practice, for ensuring that the rear face of the glass is subjected only to compressive stresses the laminate should satisfy the condition $t_m \cdot E_m > t_g \cdot E_g$ where $t_m$ and $t_g$ are the thicknesses of the metal and glass plies, as above stated, and $E_m$ and $E_g$ are their elasticity moduli, the difference in magnitude between the two values $t_m \cdot E_m$ and $t_g \cdot E_g$ being sufficient, with regard to the extent to which the laminate is flexed, to allow for the imperfect efficiency of the bond.

In preferred embodiments of the invention the relative thicknesses of the glass and metal plies, their moduli of elasticity and the efficiency of the inter-ply bond are such that the reflector can be flexed sufficiently to reduce the radius of concave curvature of the front face of the glass ply to 1 m, and most preferably to 30 cm or less, without the rear face of the glass ply becoming subjected to tensile forces. Reflectors having curvatures of radii between 1 m and 10 m are also useful in the manufacture of solar energy concentrators. Reflectors having a concave curvature with a radius of 30 cm or even smaller, e.g. 15 cm, or even below 10 cm, are required for various purposes, for example as photodiode focussing reflectors.

Preferably the relative thicknesses of the glass and metal plies, their elasticity moduli and the efficiency of the inter-ply bond are such that both the front face and the rear face of the glass ply are subjected to compressive stresses when the laminate is flexed to an extent sufficient to reduce the radius of concave curvature of the front face of the glass ply to 10 m. If the rear face of the glass ply can be kept under compressive stress, that provides an important safety factor guarding against breakage of the glass.

Preferably $t_m.E_m \geqq 1.1 \times t_g.E_g$. When observing this condition it is easy by using various commercially available bonding media to achieve an inter-ply bond of adequate efficiency to maintain compressive stresses on the rear face of the glass during flexure of the laminate to quite small radii of curvature.

Preferably the laminate is between 1.0 and 4.0 mm in thickness. Such laminates have a favourably low weight and afford relatively low resistance to flexure.

The glass ply can be untempered or tempered, for instance, by chemical tempering.

Preferably the glass ply has a thickness between 0.6 and 1.0 mm. Such plies can be very easily flexed. Glass below about 0.6 mm in thickness tends to be too liable to breakage before or during bonding to the metal ply. Glass plies in the desired thickness range are very suitable in solar energy reflectors wherein a radiant energy reflecting coating is on the rear face of the glass ply because the glass absorbs very little solar energy.

Preferably the metal ply has a thickness less than 3.0 mm and most preferably from 0.3 to 2.5 mm. Such metal plies are preferred because of the ease with which they can be flexed.

Advantageously the metal ply is made of steel. A steel ply has a high elasticity modulus, which enables a thinner ply to be used for achieving given flexural characteristics of the laminate than would otherwise be required. Preferably the steel ply is galvanised. Galvanised steel, particularly if it has been bonderised, is a very suitable material due to its cost effectiveness, its capacity to be easily and efficiently bonded to the glass, and its resistance to corrosion.

Other metals which can be used for the metal ply include aluminium, stainless steel and brass.

Referring now to the bonding layer(s), use can be made for example of one or more film-forming polymers which may be applied in sheet (e.g. thin foil) form and caused to adhere to the laminate plies by subjecting the assembly to heat and pressure.

A particularly preferred bonding medium is polyvinylbutyral. This material is convenient to use and enables very strong metal/glass bonds to be achieved which are durable under a useful range of temperatures and other fluctuating environmental conditions.

Other bonding media which have been found to give very good results are in the class of epoxy resins, e.g. the adhesive marketed under the Trade Mark "Araldite" by Ciba. When employing epoxy resins, it is beneficial to employ a mixture of epoxy resins of different molecular weights to achieve a favourable combination of high bond strength with sufficient elasticity of the bonding layer to allow for slight relative parallel displacement of the bonded faces of the metal and glass plies, for example in consequence of flexure of the laminate or differential thermal expansion of such plies.

Other suitable categories of bonding media comprise silicone-based adhesives, polyurethane adhesives and hot-melt adhesives.

The employment of hot-melt type adhesives affords a number of advantages. Among these are the facility with which they can be handled and applied to form bonding layers of predetermined thickness and uniformity. Reproducible results can be achieved under rapid assembly conditions. It is an easy matter to select a hot-melt adhesive formulation which will have a required combination of properties. The hot-melt adhesive composition can be selected to combine a very adequate bond strength with a high degree of impermeability by moisture. The use of a hot-melt type adhesive also contributes to lowering of production costs, due to the relatively low cost of the adhesive itself and the ease with which bonding can be achieved with very modest equipment and in a small working area.

The hot-melt adhesive is preferably one which is molten at a temperature of 150° C. or lower, preferably between 60° and 120° C.

Hot-melt adhesive formulations include an elastomeric or thermoplastic material which melts easily to a low viscosity fluid. In order to achieve solidified bonding layers of adequate strength and cohesiveness, this easily meltable ingredient is blended with a higher molecular weight polymeric material. A very favourable balance of properties can be achieved by formulating the hot-melt adhesive to incorporate a combination of resins of different melt indices.

Examples of relatively easily meltable substances which can be used in hot melt adhesive formulations are various natural and synthetic resins and waxes, such as terpene resins, hydrocarbon resins, polyterpenes, phenol-formaldehyde resins, alkyds, coumarone-indene resins, rosin and rosin derivatives and mineral, vegetable and petroleum waxes.

In preferred embodiments of the present invention a hot-melt adhesive composition is used which includes one or more tackifiers selected from terpene and phenolic resins and microcrystalline waxes. Very good results are also attainable with styrenes and low-molecular homologues.

Examples of higher molecular weight synthetic polymeric materials suitable as reinforcing or toughening ingredient of the hot-melt adhesive composition, forming what is sometimes referred to as the adhesive backbone, are polyvinyl acetate, polyethylene, polyisobutylene (butyl rubber), polystyrene and styrene copolymers, ethyl cellulose, polyamides derived from dimerized fatty acids and diamines, and butyl methacrylates.

In preferred embodiments of the present invention a hot-melt adhesive is used which includes one or more elastomers or thermoplastics selected from butyl rubber and ethylene/vinyl acetate copolymers.

The hot-melt adhesive may incorporate various other types of ingredients for confering required properties, for example as specified in German Offenlegungschrift No. 2,713,351. Examples of categories in which such supplementary ingredients fall are plasticisers, thermal stabilizers and fillers. Plasticisers are useful for improving adhesive wetting of the surfaces, stabilisers are used for improving thermal stability, and fillers are substantially chemically inert and are useful for modifying the physical properties of the adhesive.

Preferably the thickness of the layer or each layer of hot-melt adhesive, when used, is less than 150 microns. This condition is recommended because it exploits an important property of hot-melt adhesives, namely their ability to give very effective bonds even as very thin layers. Further such thin layers leave a very small surface area of adhesive exposed to the environmental atmosphere.

In preferred embodiments, a hot-melt adhesive is used having a water resistance of less than 0.5 and most preferably less than 0.1 g $H_2O$ per $m^2$ of surface per 24 hrs per mm thickness per cm Hg of pressure.

The invention also includes reflectors as hereinbefore defined wherein the glass and metal plies are bonded by means of an acrylic resin based adhesive.

The invention further includes reflectors as hereinbefore defined wherein the glass and metal plies are bonded by means of a polyvinylchloride bonding layer.

In some embodiments of the invention, the metal and glass plies are bonded together by means of two or more different bonding media. For example, the invention includes reflectors in which the plies are bonded together by means of two or more bonding layers of different compositions. In certain products in this category the plies are bonded together by means of an adhesive coated thermoplastics foil applied as such between the glass and metal plies prior to application of laminating conditions, normally heat and pressure. A specific example giving very good results employs for the bonding function a foil of a polyester bearing a coating of an acrylic resin based adhesive on each side thereof. Such double-coated foils are commercially available. Suitable foils are for example those marketed under the Trade Marks MACBOND 2800 and MACBOND 2132.

The bonding layer(s) of a reflector according to the invention can incorporate reinforcement, e.g. a fibrous or filamental reinforcement composed of glass or polyamide fibres or filaments. The reinforcement can be resin-impregnated.

The actual bonding step in the manufacture of the reflector may be achieved by means of calender rolls or by means of a press. In order to avoid occlusions of air or other gases between the plies, bonding under heat and pressure can be achieved within a chamber in which the assembly of plies and bonding medium or bonding media is subjected to a predetermined schedule of heat and pressure variations. The margins of the assembly may be placed in communication with a suction device by which suctional forces are propagated to the inter-ply zone(s) to promote evacuation of gases therefrom. The use of suction can be controlled in timed relation to the incidence of predetermined ambient heat and/or pressure conditions in the course of a heating and pressing cycle within the chamber. Such bonding techniques are known per se in relation to the manufacture of other kinds of laminates, in particular glass/glass laminates (see e.g. United Kingdom Pat. No. 1,368,785).

Preferably the radiation-reflecting surface is provided by a coating on the glass ply. In the most preferred embodiments this coating is on the rear face of the glass ply. The metal ply then fulfils a protective role with respect to the coating. The reflector preferably incorporates between the reflecting coating and the metal ply, one or more protective layers for the optical coating, for example a layer of protective paint and a varnish layer such as are employed in the production of conventional glass mirrors.

The invention includes reflectors in which the glass ply bears a light-reflecting coating on its front face. Such a front face coating can be applied e.g. after bonding the glass to the metal ply. In such a reflector the metal ply does not protect the reflecting coating but serves merely as a support for the glass ply.

The reflecting coating is preferably a coating of silver, the advantage being a very high light-reflectivity, which is very important for solar energy reflectors.

As an alternative to silver, other metals can be used for the reflective coating, for example metals with better resistance to the chemical action of agents in the atmosphere.

As an alternative to the use of a reflecting coating on the glass, a reflector according to the invention can comprise a metal ply which provides a radiant energy-reflecting inner face, this face being covered by the glass ply.

Preferably the metal ply is of such dimensions and is so positioned relative to the glass ply that at least two opposed margins of the metal ply project from the corresponding opposed edges of the glass ply. The projecting metal ply margins afford protection to the corresponding edges of the glass against mechanical damage, such as might be caused by impact against another object. Forces for imparting curvature or additional curvature to the laminate can then be exerted on the projecting margins of the metal ply.

Advantageously, the projecting metal ply margins as referred to above assist in supporting protective deposits of material, for example glue, against the corresponding edge faces of the glass ply.

Preferably, opposed edges of the glass ply are buttressed to relieve the bonding medium of shear stresses tending to cause delamination when the laminate is flexed. In certain embodiments such edges are buttressed by abutments, e.g. abutments of metal or elastically deformable material, which are secured against those edges of the glass ply. For example such abutments may be secured to a face of the metal ply at projecting margins thereof or the abutments may be interposed between the glass ply edges and edge strips secured to opposed edges of the laminate.

A laminate according to the invention can be naturally flat or it can have a slight natural curvature such as may sometimes occur when producing the laminate from flat metal and glass plies which are very thin.

The invention includes a curved reflector which comprises a laminate according to the invention as above defined, the laminate being held in flexed condition against elastic recovery forces in the laminate by a holding device, the front face of the glass ply being concave.

Preferably the holding device maintains the laminate in flexed condition by forces transmitted wholly or in part through opposed edge faces of the glass ply. This form of co-operation between the laminate and the holding device is very advantageous for avoiding any tendency for the elastic recovery forces to encourage delamination.

In certain advantageous embodiments of the invention, the holding device extends across the opposed edges of the laminate which are parallel with an axis or axes of curvature of the laminate and the device opposes elastic recovery forces in the laminate by bearing directly or through interposed bearing elements against the corresponding edges of the glass ply or against both those edges and the corresponding edges of the metal ply. Advantageously, the margins of the metal ply which include those edges thereof project beyond the corresponding edges of the glass ply.

In certain very advantageous embodiments of the invention, the holding device and the laminate have co-operating abutments via which the elastic recovery forces in the laminate are transmitted to the holding device to hold the laminate in curved condition and the abutments on the laminate and/or the holding device are screw-adjustable for adjusting the curvature of the laminate.

In particularly important embodiments of the invention, the holding device has a plurality of holding locations, at each of which a laminate is installed and held in curved condition so that the individual laminates form constituent parts of a larger curved reflector.

Preferably the holding device for the laminate is made of metal but any other material or materials can be used provided the device has the necessary strength and rigidity.

The forces for elastically flexing the laminate can be exerted against opposed sides of the laminate, in directions generally normal to its plane, for example in the case of a rectangular laminate by exerting such forces against one pair of opposed margins at one side of the laminate and against the other pair of opposed margins at the opposite side of the laminate. Flexing forces exerted in that way tend to oppose separation of the glass and metal plies. However, as an alternative the laminate can be elastically flexed by exerting forces acting towards each other on two opposed edges or margins of the laminate or of the glass ply. In the case of a circular laminate a spherical curvature can be imparted to it by exerting radially inward forces on the peripheral zone or by exerting opposite forces at the peripheral zone of the laminate and at its centre.

The invention includes a method of making a curved radiant energy reflector, in which a glass ply is bonded to a metal ply to form a laminate having a radiant energy reflecting surface which is formed by the metal ply or by a ply coating, forces are applied to impart to the laminate a curvature such that the front face of the glass (i.e. its face which is remote from the metal ply) is concave, and the curved laminate is installed in a holding device which holds the laminate in curved condition, against elastic recovery forces in the laminate.

In carrying out this method, the rear face of the glass ply becomes convexly curved but due to the presence of such metal ply and the bond between the two plies, tensile loading of that face is avoided or reduced. This is important because the imposition of tensile surface stresses in the glass can lead to breakage, particularly if there are surface flaws in the glass which may act as stress raisers. If the metal ply is appropriately chosen and efficiently bonded to the glass, as herein described, the laminate can be flexed to an appreciable degree without breaking the glass, even when using a piece of untempered glass and one which has not been specially surface-treated to remove surface flaws.

The method according to the invention lends itself to mass production manufacture and is suitable for producing a multiplicity of mirrors each conforming with a high degree of accuracy to a predetermined curvature.

Preferably the laminate is held to a radius of curvature of 10 meters or less, and most preferably less than 1 meter.

Preferably the glass ply used in carrying out a said method according to the invention bears a radiant energy-reflecting coating of silver or other material on that face thereof which becomes covered by the metal ply.

In carrying out the method of the invention it is preferred for the relative thicknesses of the glass and metal plies, their elasticity moduli and the efficiency of the inter-ply bond to be such that the rear face of the glass ply is not subjected to tensile stresses by the flexing of the laminate and most preferably said parameters are such that both the front face and the rear face of the glass ply are subjected to compressive stresses by such flexing step.

The laminate used in a method according to the invention can have any of the various optional features pertaining to a laminate in accordance with the invention as hereinbefore described.

In these figures the thicknesses of laminate plies and coatings have been exaggerated.

DESCRIPTION OF THE PREFERRED EMBODIMENTS

Figure 1:
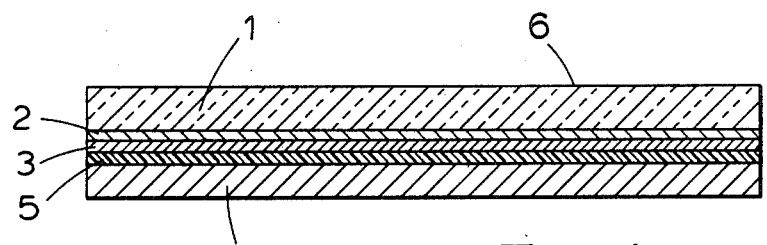
FIG. 1 is a cross-sectional view of a flat reflector according to the present invention.

The reflector shown in FIG. 1 comprises a glass ply 1 bearing on its rear face a silver coating 2 which specularly reflects a high proportion of the light which is incident on the coating via the glass ply. A protective coating 3 (which may be a single or plural-layer coating) is applied over the silver coating 2. The coated glass ply is bonded to a metal ply 4 by means of a layer of bonding medium 5.

In certain embodiments the metal ply is thinner than the glass ply (e.g. the metal ply has a thickness slightly in excess of one third of the thickness of the glass ply). Nevertheless the laminate can be flexed to impart to the front face 6 of the glass ply a concave curvature having a radius of 10 m without the rear face of the glass ply becoming subjected to tensile stresses. Preferably the thicknesses and moduli of the plies and the efficiency of the bond between them are such that the neutral bending planes, that is the planes within the thickness of the laminate in which tensile and compressive stresses become balanced during the bending of the laminate, remain located within the thickness of the metal ply.

Figure 2:
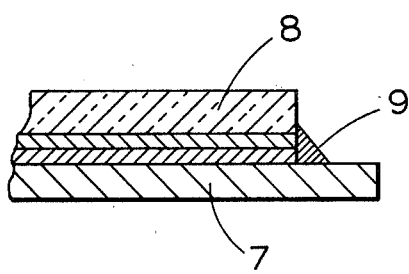
FIG. 2 is a detail of a modification of the reflector shown in FIG. 1.

As shown in FIG. 2 such a reflector can be formed using a metal ply 7 which is larger than the glass ply 8 so that margins of the metal ply project from the edges of the glass and can support a bead 9 of excess bonding medium against the edges of the glass ply to give better resistance to ingress of moisture between the plies.

In order to manufacture a curved reflector according to the invention, after making a flat or substantially flat laminate, for example as represented in FIG. 1 or 2, it is flexed to impart a required radius or required radii of concave curvature to the front face of the glass ply. The laminate while in such flexed condition is mounted in a holding device which holds the laminate in flexed condition against the elastic recovery forces in the laminate.

In a laminate according to FIG. 1 or 2, the metal ply reduces or avoids tensile stressing of the rear face of the glass ply during the flexing operation, depending on the degree of flexure.

Figure 3:
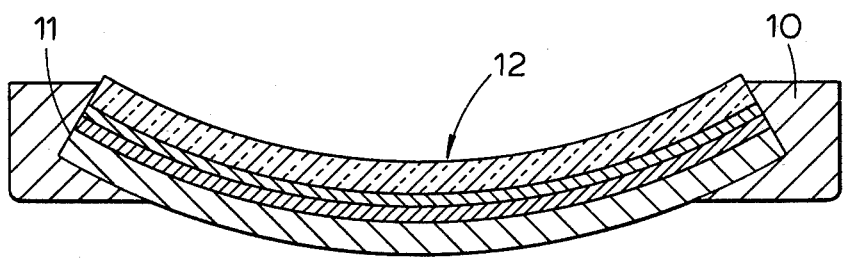
FIG. 3 is a cross-sectional view of a curved reflector.

A suitable and very simple form of holding device comprises a frame 10 in FIG. 3 with a rebate groove 11 which receives opposed edges of the curved laminate 12. The elastic recovery forces urge the opposed edges of the laminate against opposed sides of the frame and the latter is of the correct size for ensuring that in that condition the laminate has the required predetermined cylindrical curvature.

Figure 4:
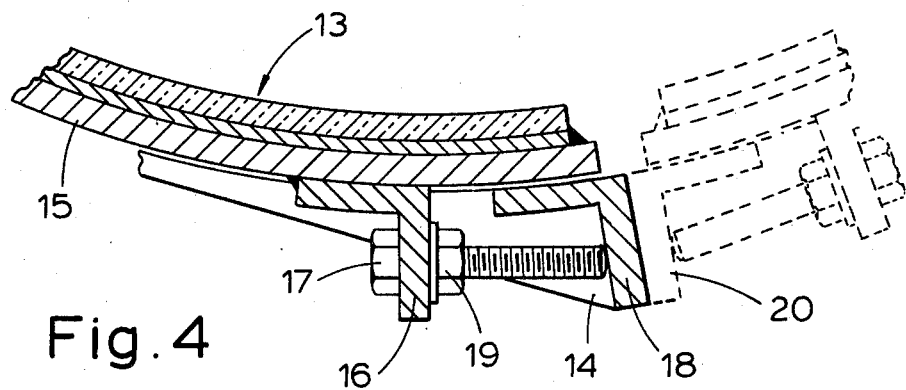
FIGS. 4 and 5 are cross-sections of part of two further curved reflectors.

FIG. 4 shows a reflector according to the invention having screw adjustment facilty whereby the reflector curvature can be adjusted. The reflector comprises a laminate 13, constructed as described with reference to FIG. 2, and a holding device 14 formed by a metal frame. Near each of two opposed edges of the laminate an abutment member is soldered or welded to the metal ply 15. The figure shows one of these abutment members 16. Each of these abutment members has a tapped hole for receiving a threaded adjustment bolt, such as 17. The framework has flanges such as 18 against which the extremities of the bolts 17 abut and which thereby hold the laminate in curved condition. Its curvature can be adjusted by turning the bolts and these are locked in adjusted position by nuts 19. The composition of the laminate is such that it can be curved to a radius substantially less than 10 meters without the rear face of the glass ply becoming subjected to tensile stresses.

The reflector shown in FIG. 4 can be part of a radiant energy concentrator composed of a multiplicity of such reflectors held in appropriately curved condition. For example the frame 14 may form part of a larger framework 20 part of which is indicated in broken lines, which has a multiplicity of similar holding locations so that a multiplicity of such laminates can be held in curved condition by the framework.

Figure 5:
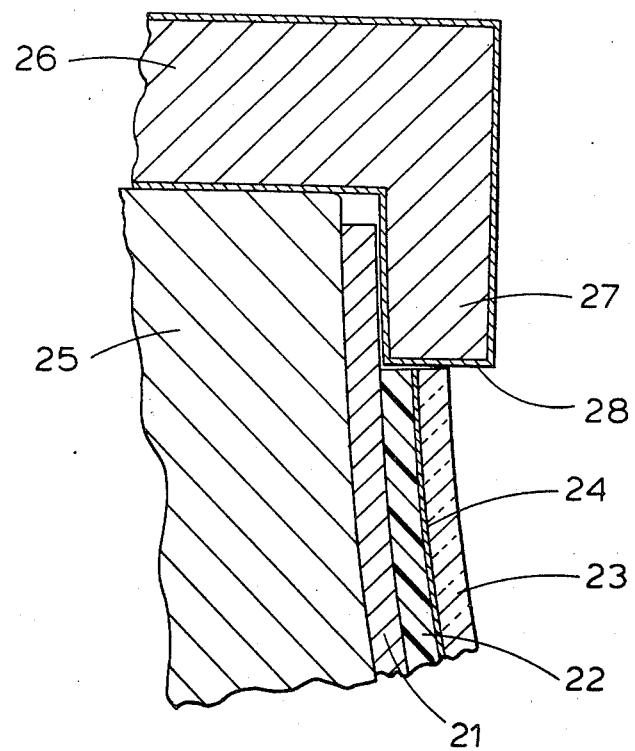

Referring now to FIG. 5, the curved reflector comprises a laminate incorporating a metal ply 21, a bonding layer 22 and a mirror which comprises glass ply 23 bearing on its rear face a light-reflecting coating and one or more protective coatings located between such light-reflecting coating and the bonding layer 22, such light-reflecting and protective coatings being together designated 24.

The laminate is of elongate rectangular form. The glass and metal plies have the same width but the metal ply is longer than the glass ply and those plies are bonded together in relative positions such that marginal portions of the metal ply at the opposed ends of the laminate project past the corresponding end edge faces of the glass ply.

A very satisfactory laminate composition is one in which the metal ply is a galvanised steel ply and is bonded to the coated glass ply by means of a bonding layer 22 composed of polyvinylbutyral.

The laminate is held in curved condition by a holder comprising a back wall 25 and end component 26 having flanges 27 which extend over the projecting marginal portions of the steel ply 21 and abut against the corresponding end edge faces of the glass ply 23 so as to prevent the laminate from flattening under the elastic recovery forces stored therein as a result of its flexure. The face of the back wall 25 next to the laminate has a curvature corresponding with that imparted to the laminate so that the steel ply is in contact with such wall over its entire length. The end components 26 have a coating 28 of plastics or synthetic rubber in order to prevent damage to the glass ply. There is a clearance between the edges of the metal ply and the holder end components 26 to allow for thermal expansion of the ply. This illustrated construction is very suitable for a solar energy concentrator comprising a multiplicity of individual curved reflectors each composed and held in curved condition as shown in the figure.

Figure 6:
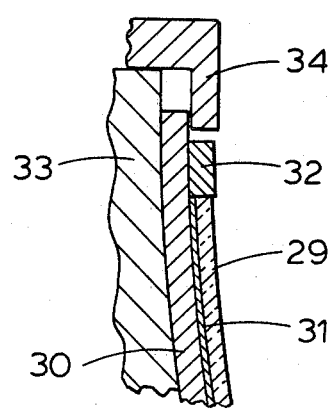
FIG. 6 is a side elevational view of part of a further curved reflector.

In the curved reflector shown in FIG. 6 a laminate according to the invention and comprising a glass ply 29 bearing on one side a light-reflecting coating (not shown) is bonded at that side to a metal ply 30 by means of a bonding layer 31. At opposed ends of the laminate, margins of the metal ply project beyond the corresponding edges of the glass ply. Before flexure of the laminate, an abutment element 32 is secured to each of such margins so as to form buttresses against the opposed edges of the glass ply. For example such abutment elements may be metal elements which are soldered or welded or secured by adhesive to the metal ply. When the laminate is flexed, these abutment elements wholly or partially relieve the bonding layer of shear stresses resulting from elastic recovery forces in the glass ply. The laminate is held in curved condition by a holding device similar to that shown in FIG. 5 and comprising a backing 33 with end clamps 34 which extend over the projecting marginal portions of the metal ply.

Figure 7:
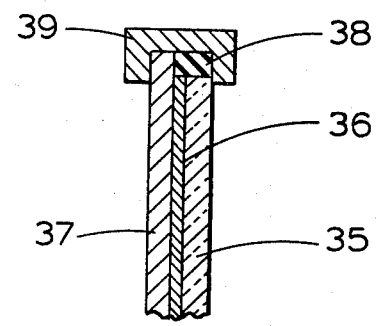
FIG. 7 is a cross-sectional elevational view of part of a flat reflector.

FIG. 7 shows a laminate according to the invention in which a glass ply 35 bearing a light-reflecting coating (not shown) on its inner face is bonded by means of a bonding layer 36 to a metal ply 37 which projects beyond the edges of the glass ply at opposed margins of the laminate. On each such projecting margin of the metal ply there is located an abutment element 38 in the form of a strip of elastomeric material and those margins of the laminate are enveloped by metal end strips 39 of channel form. These channels can be secured in place by clamping forces or by adhesive or in some other manner. When the laminate is flexed in a direction which imparts a concave curvature to the exposed face of the glass ply about an axis or axes of curvature parallel to the opposed end strips 39, the abutment elements 38, being held firmly against the adjacent edges of the glass ply, relieve the bonding layer of shear stresses to a greater or lesser extent.

In a modification of the laminate shown in FIG. 7, the metal ply has a polished inner face providing the light-reflecting surface of the laminate and there is no light-reflecting coating on the glass ply.

Various concentrations alternative to those shown can be employed. For example there may be a reflector support which has a curved profile or form corresponding with that imparted to the reflector, and to which the reflector is secured by adhesive.

The following are specific examples of laminates according to the invention.

EXAMPLE 1

A laminate as shown in FIG. 1 was prepared by bonding a ply 1 of ordinary untempered glass, 0.75 mm in thickness, to a metal ply 4 formed of galvanised steel and having a thickness of 0.67 mm. Prior to such bonding the glass ply was provided with a light-reflecting coating 2 of silver and a protective coating 3 composed of a layer of copper and a layer of protective paint as used in conventional mirror production.

The coated glass and the metal ply were bonded together by a layer of an epoxy-based adhesive marketed under the Trade Mark "Araldite" by Ciba. It was found that the laminate could be flexed within the elastic limit of the metal to impart to the front face of the glass ply a concave curvature as small as 18.5 cm without breakage of the glass. Continued flexing beyond the elastic limit led to breakage of the glass when the radius of curvature reached 12.5 cm. Laminates manufactured by this procedure were used for forming curved mirrors by installing them in flexed condition in holding devices which held the laminates in flexed condition against their elastic recovery forces.

EXAMPLE 2

Laminates were produced as represented in FIG. 1 using a glass ply 0.8 mm in thickness, galvanised steel for the metal ply and a hot-melt adhesive for bonding the metal ply to the coated glass. The adhesive layer was 40 microns in thickness and was formed by a hot-melt adhesive comprising ethylene/vinyl acetate. For one laminate the steel ply had a thickness of 1 mm. It was found that the laminate could be flexed down to a radius of curvature of 18 cm. As an alternative to this bonding medium a hot-melt adhesive comprising butyl rubber and wax can be used.

A very satisfactory laminate capable of being flexed without breakage of the glass ply was made, using glass and galvanised steel plies as above specified and a hot-melt adhesive of the following composition:

| | | Parts by Weight |
|---|---|---|
| EVA 607 | (ethylene/vinyl acetate copolymer marketed by Union Carbide Corporation) | 40 |
| Dylt | (polyethylene marketed by Union Carbide Corporation) | 5 |
| CKM 2400 | (phenolic resin tackifier marketed by Union Carbide Corporation) | 15 |
| Klyrvel 90 | (hydrocarbon-based plasticiser and tackifier marketed by Velsicol Chemical Corporation) | 7.5 |
| Piccolyte A115 | (polyterpene-based adhesive marketed by Pennsylvania Ind. Chem. Corporation) | 12.5 |
| Be.Square 130–195 | (microcrystalline wax marketed by Bareco Division of Petrolite Corporation) | 20 |
| Antioxidant 330 | marketed by Ethyl Corporation | 0.1 |

EXAMPLE 3

Two laminates A and B were made each comprising a glass ply bonded to a galvanised steel ply. Laminate A comprised a glass ply 0.8 mm thick bonded by means of a hot-melt adhesive based on a copolymer of ethylene and vinyl acetate to a steel ply also 0.8 mm in thickness. Laminate B comprised a glass ply 0.75 mm in thickness bonded by means of the epoxy-based adhesive marketed under the Trade Mark "Araldite" to a galvanised steel ply 0.75 mm in thickness.

The two laminates were flexed to test their resistance to breakage. It was found that laminate A failed by rupture of the adhesive bond at a curvature of 21 cm. By contrast laminate B remained unimpaired during flexure until the radius of curvature was reduced to 11.7 cm.

EXAMPLE 4

A curved reflector as represented in FIG. 5 included a laminate incorporating a galvanised steel ply 21. This steel ply was bonded to a mirror produced by chemically tempering a sheet of glass 0.8 mm in thickness and then applying to such tempered glass a coating of silver and a protective overcoating in accordance with known practice in mirror production. The galvanised steel ply 0.8 in thickness and the mirror were assembled with an intervening polyvinylbutyral foil 0.76 mm in thickness and subjected to heat and pressure to cause the mirror to become firmly bonded over its entire area to the steel ply. The product $t_m.E_m$ of the resulting laminate was greater than $1.1 \times t_g.E_g$. To make a solar energy concentrator, the laminate was flexed to impart to the front face of the glass ply a radius of curvature of 1.8 meters and was held in this condition by a holding device as shown in the figure. In the flexed condition of the laminate the glass ply was free from tensile stresses. If required it is also possible in the same way to make curved solar energy concentrators having e.g. radii of curvature between 50 cm and 3 meters using similar laminates having a glass ply between 0.6 and 1.2 mm in thickness.

We claim:

1. A flexible radiant energy reflector including a laminate comprising a metal ply, a glass ply having a front face and a rear face and having a thickness between 0.6 and 1.0 mm, means bonding said glass ply over the entire area of its rear face to said metal ply in an inter-ply bond and means associated with one of the plies and providing a radiant-energy reflecting surface, wherein said metal and glass plies are given relative thicknesses and moduli of elasticity such, and said bonding means provides an inter-ply bond of such efficiency, that the rear face of said glass ply is not subjected to tensile stresses when the laminate is flexed, within the elastic limit of said metal ply, to give the front face of said glass ply a concave curvature of a radius of 10 meters.

2. A reflector according to claim 1, wherein said reflecting surface is the surface of said metal ply which is bonded to said glass ply.

3. A reflector according to claim 1 wherein said means providing a reflecting surface is a coating on said glass ply or said metal ply.

4. A reflector according to claim 1 wherein the rear face of said glass ply is not subjected to tensile stresses when the laminate is flexed such that the front face of said glass ply has a concave curvature of radius of 1 meter.

5. A reflector according to claim 4 wherein the rear face of said glass ply is not subjected to tensile stresses when the laminate is flexed such that the front face of said glass ply has a concave curvature of radius of 0.3 meter.

6. A reflector according to claim 1 wherein said glass and metal plies are given relative thicknesses and moduli of elasticity such and wherein said bonding means provides an inter-ply bond of such efficiency such that both the front face and the rear face of said glass ply are subjected to compressive stresses when said laminate is flexed such that the front face of the glass ply has a concave curvature of a radius of 10 meters.

7. A reflector according to claim 1, wherein $t_m.E_m \geq 1.1 \times t_g.E_g$ where $t_m$ and $t_g$ are the thicknesses of said metal ply and said glass ply respectively and $E_m$ and $E_g$ are the moduli of elasticity of said metal ply and said glass ply respectively.

8. A reflector according to claim 1, wherein said laminate is between 1.0 and 4.0 mm in thickness.

9. A reflector according to claim 1, wherein said metal ply has a thickness less than 3.0 mm.

10. A reflector according to claim 9, wherein said metal ply has a thickness of from 0.3 to 2.5 mm.

11. A reflector according to claim 1, wherein said metal ply is made of steel.

12. A reflector according to claim 11, wherein said steel ply is a galvanized steel ply.

said glass ply a concave curvature of a radius of 10 meters, and opposed edges of said glass ply include buttressing means to relieve said bonding means of shear stresses tending to cause delamination when said laminate is flexed, and additionally comprising edge strips secured to opposed edges of said laminate, wherein said buttressing means comprise abutments interposed between said edges and said edge strips.

40. A flexible radiant energy reflector including a laminate comprising a metal ply, a glass ply having a front face and a rear face, means bonding said glass ply over the entire area of its rear face to said metal ply in an inter-ply bond and means associated with one of the plies and providing a radiant-energy reflecting surface, wherein said metal and glass plies are given relative thicknesses and moduli of elasticity such, and said bonding means provides an inter-ply bond of such efficiency, that the rear face of said glass ply is not subjected to tensile stresses when the laminate is flexed, within the elastic limit of said metal ply, to give the front face of said glass ply a concave curvature of a radius of 10 meters, and additionally comprising a holding device by which said laminate is held in flexed condition against elastic recovery forces in the laminate and includes at least one axis of curvature, the front face of the glass ply being concave, and wherein said holding device maintains said laminate in flexed condition by forces transmitted wholly or in part through opposed edge faces of said glass ply.

41. A reflector according to claim 40, wherein said holding device and said laminate have cooperating abutments by which the elastic recovery forces in said laminate are transmitted to said holding device to hold said laminate in curved condition and said abutments on said laminate and/or said holding device include screw-adjustable means for adjusting the curvature of said laminate.

42. A reflector according to claim 40, which is curved and which comprises a plurality of said laminates which are installed adjacent to each other and held in curved condition.

43. A flexible radiant energy reflector including a laminate comprising a metal ply, a glass ply having a front face and a rear face, means bonding said glass ply over the entire area of its rear face to said metal ply in an inter-ply bond and means associated with one of the plies and providing a radiant-energy reflecting surface, wherein said metal and glass plies are given relative thicknesses and moduli of elasticity such, and said bonding means provides an inter-ply bond of such efficiency, that the rear face of said glass ply is not subjected to tensile stresses when the laminate is flexed, within the elastic limit of said metal ply, to give the front face of said glass ply a concave curvature of a radius of 10 meters, and additionally comprising a holding device by which said laminate is held in flexed condition against elastic recovery forces in the laminate and includes at least one axis of curvature, the front face of the glass ply being concave, and wherein said holding device extends across the opposed edges of said laminate which are parallel with an axis of curvature of said laminate and said device opposes elastic recovery forces in said laminate by bearing directly against the corresponding edges of said glass ply or against those edges and against the corresponding edges of said metal ply.

44. A reflector according to claim 43, wherein the margins of said metal ply which includes said edges thereof project beyond the corresponding edges of said glass ply.

45. A flexible radiant energy reflector including a laminate comprising a metal ply, a glass ply having a front face and a rear face, means bonding said glass ply over the entire area of its rear face to said metal ply in an inter-ply bond and means associated with one of the plies and providing a radiant-energy reflecting surface, wherein said metal and glass plies are given relative thicknesses and moduli of elasticity such, and said bonding means provides an inter-ply bond of such efficiency, that the rear face of said glass ply is not subjected to tensile stresses when the laminate is flexed, within the elastic limit of said metal ply, to give the front face of said glass ply a concave curvature of a radius of 10 meters, and additionally comprising a holding device by which said laminate is held in flexed condition against elastic recovery forces in the laminate and includes at least one axis of curvature, the front face of the glass ply being concave, and bearing elements interposed between said holding device and said laminate, wherein said holding device extends across the opposed edges of said laminate which are parallel with an axis of curvature of said laminate and said device opposes elastic recovery forces in said laminate by bearing through said bearing elements against the corresponding edges of said glass ply or against those edges and against the corresponding edges of said metal ply.

* * * * *

13. A reflector according to claim 1, wherein said bonding means comprise an adhesive selected from the group consisting of hot-melt, epoxy resin, polyvinylbutyral, polyurethane, acrylic resin and polyvinylchloride adhesives, which is interposed between said glass and metal plies.

14. A reflector according to claim 1, wherein said bonding means comprise a thermoplastics foil, bearing a coating of an adhesive on each side thereof, interposed between said glass and metal plies.

15. A reflector according to claim 14, wherein said thermoplastics foil is a polyester foil.

16. A reflector according to claim 14, wherein said thermoplastics foil bears a coating of acrylic resin adhesive on each side thereof.

17. A reflector according to claim 1, wherein said means providing a radiation-reflecting surface is a coating on said glass ply.

18. A reflector according to claim 17, wherein said coating is on the rear face of said glass ply.

19. A reflector according to claim 17, wherein said means providing a radiation-reflecting surface is a radiation-reflecting coating of silver.

20. A reflector according to claim 1, wherein said metal ply is of such dimensions and is so positioned relative to said glass ply that at least two opposed margins of said metal ply project beyond the corresponding opposed edges of said glass ply.

21. A reflector according to claim 20, additionally comprising protective deposits of material supported by said projecting margins against corresponding edge faces of said glass ply.

22. A reflector according to claim 1, wherein opposed edges of said glass ply include buttressing means to relieve said bonding means of shear stresses tending to cause delamination when said laminate is flexed.

23. A reflector according to claim 22, wherein said buttressing means comprise abutments which are secured to a face of said metal ply at projecting margins thereof.

24. A reflector according to claim 22, additionally comprising edge strips secured to opposed edges of said laminate wherein said buttressing means comprise abutments interposed between said edges and said edge strips.

25. A reflector according to claim 1, additionally comprising a holding device, by which said laminate is held in flexed condition against elastic recovery forces in the laminate and includes at least one axis of curvature, the front face of the glass ply being concave.

26. A reflector according to claim 25, wherein said holding device maintains said laminate in flexed condition by forces transmitted wholly or in part through opposed edge faces of said glass ply.

27. A reflector according to claim 25 or 26, wherein said holding device extends across the opposed edges of said laminate which are parallel with an axis of curvature of said laminate and said device opposes elastic recovery forces in said laminate by bearing directly against the corresponding edges of said glass ply or against those edges and against the corresponding edges of said metal ply.

28. A reflector according to claim 25 or 26, additionally comprising bearing elements interposed between said holding device and said laminate, wherein said holding device extends across the opposed edges of said laminate which are parallel with an axis of curvature of said laminate and said device opposes elastic recovery forces in said laminate by bearing through said bearing elements against the corresponding edges of said glass ply or against those edges and against the corresponding edges of said metal ply.

29. A reflector according to claim 27, wherein the margins of said metal ply which include said edges thereof project beyond the corresponding edges of said glass ply.

30. A reflector according to claim 25 or 26, wherein said holding device and said laminate have cooperating abutments by which the elastic recovery forces in said laminate are transmitted to said holding device to hold said laminate in curved condition and said abutments on said laminate and/or said holding device include screw-adjustable means for adjusting the curvature of said laminate.

31. A reflector according to claim 25 or 26, which is curved and which comprises a plurality of said laminates which are installed adjacent to each other and held in curved condition.

32. A method of making a curved radiant energy reflector comprising bonding, by means of a continuous layer of a bonding medium, the rear face of a flat, unitary glass ply having front and rear faces and a thickness of between 0.6 and 1.0 mm to a flat metal ply in an inter-ply bond, to form a laminate which includes a radiant-energy reflecting surface, applying force to said laminate in order to impart to said laminate a curvature such that the front face of said glass ply is concave, and installing the curved laminate in a holding device which holds said laminate in curved condition against elastic recovery forces in said laminate.

33. A method according to claim 32, wherein said reflecting surface is the surface of said metal ply which is bonded to said glass ply.

34. A method according to claim 32, wherein said reflecting surface is a coating on said glass ply or said metal ply.

35. A method according to claim 34, wherein said reflecting surface is a coating on the rear face of said glass ply.

36. A method according to claim 32, 33, 34, or 35, wherein said glass and metal plies have thicknesses and moduli of elasticity such, and said bonding provides an inter-ply bond of such efficiency, that the rear face of said glass ply is not subjected to tensile stresses by flexing of said laminate.

37. A method according to claim 36, wherein said glass and metal plies have thicknesses and moduli of elasticity such, and said bonding provides an inter-ply bond of such efficiency, that both the front and rear faces of said glass ply are subjected to compressive stresses by flexing of said laminate.

38. A method according to claim 32, 33, 34, or 35, wherein the front face of said glass ply is held to a radius of curvature of less than 10 meters.

39. A flexible radiant energy reflector including a laminate comprising a metal ply, a glass ply having a front face and a rear face, means bonding said glass ply over the entire area of its rear face to said metal ply in an inter-ply bond and means associated with one of the plies and providing a radiant-energy reflecting surface, wherein said metal and glass plies are given relative thicknesses and moduli of elasticity such, and said bonding means provides an inter-ply bond of such efficiency that the rear face of said glass ply is not subjected to tensile stresses when the laminate is flexed, within the elastic limit of said metal ply, to give the front face of